Patented May 24, 1927.

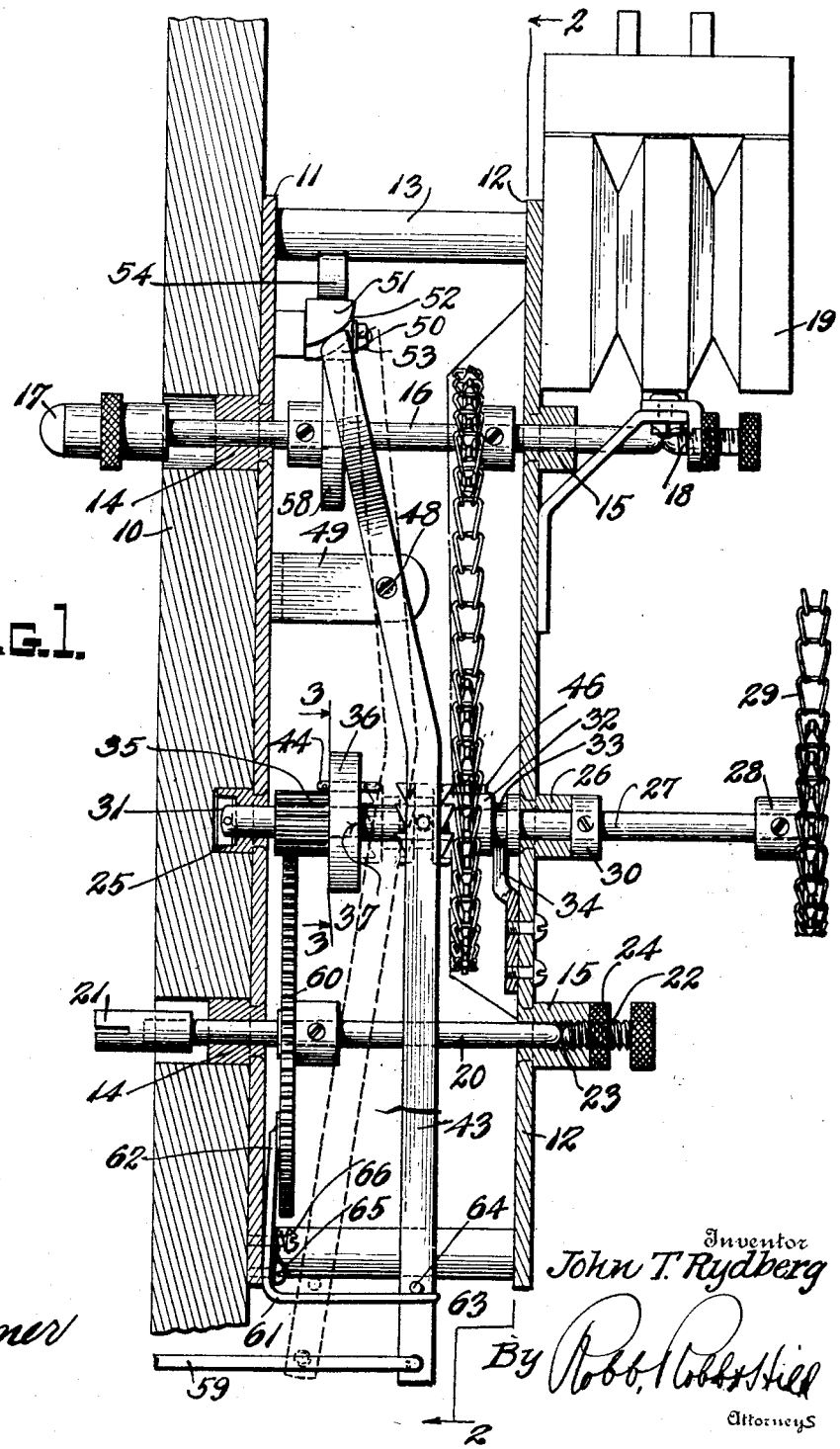

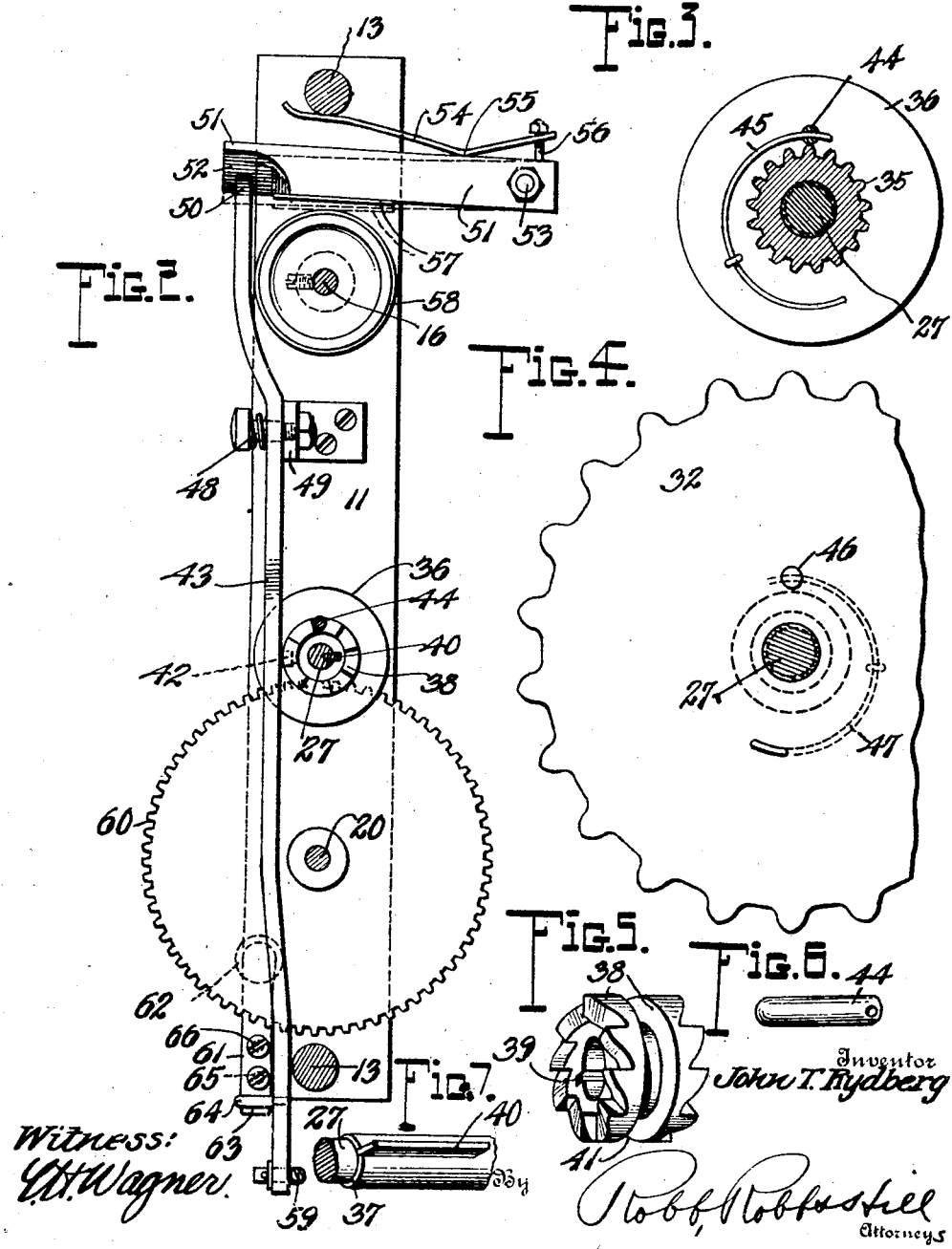

1,630,035

UNITED STATES PATENT OFFICE.

JOHN T. RYDBERG, OF HARRISON, NEW JERSEY, ASSIGNOR, BY DIRECT AND MESNE ASSIGNMENTS, TO SUPREME PLAYER ACTION CORPORATION, A CORPORATION OF NEW JERSEY.

TRANSMISSION MECHANISM FOR PLAYER ACTIONS.

Application filed March 11, 1924. Serial No. 698,442.

This invention relates to transmission mechanism for player actions, and particularly to a construction for controlling the winding and rewinding of the music roll and take-up roll in a piano action of this character.

In prior constructions the driving pinion for the gear upon the take-up roll has been shifted into and out of driving relation with the gear thereon, which resulted in a noisy operation when the teeth were not properly aligned and also prevented immediate meshing which resulted in undue wear upon the parts between the power shaft and the rewinding shaft. It has also been found that in the rewinding action the speed transmitted to the music roll is materially greater than the normal winding speed and if the take-up roll is allowed to run free a slack is produced in the music sheet which prevents a tight rewinding thereof upon the music roll and also throws the sheet out of proper feeding relation, which frequently results in tearing or mutilation thereof.

In order to overcome these difficulties it has been found important to provide a driving transmission in which the shifting of the drive from one shaft to the other may be accomplished in a practically silent manner and through a yielding connection which will insure prompt and positive driving relation between the parts and prevent the clashing of gears in their operation.

It is also very desirable to restrain the free rotation of the take-up roll during a rewinding action, and for this purpose braking means are provided and disposed under the automatic control of the shift lever to act upon the driving shaft of the take-up roll when the opposite roll is in driving relation for rewinding.

The invention has for an object to provide a novel and improved construction in which the driving pinion and gear for the take-up roll are constantly maintained in meshing relation and the connection between said pinion and the power shaft effected by a shifting clutch which is adapted in its alternate movement to establish a driving relation with the opposite rolls.

A further object of the invention is to provide a novel construction of clutch mechanism slidingly keyed upon a power shaft to engage transmission devices at opposite sides thereof, and carried by a shifting lever which is frictionally retained in its opposite positions to maintain driving relation with either of the driving shafts for the music roll or the take-up roll.

Another object of the invention is to present a new construction wherein a brake device is automatically applied to the driving shaft for the take-up roll when the same is released from the power shaft and the sheet unwound therefrom during the rewinding action, such brake being automatically applied when the power transmission means is in operative relation for the rewinding operation.

Other and further objects and advantages of the invention will be hereinafter set forth and the novel features thereof defined by the appended claims.

In the drawings:—

Figure 1 is a vertical section showing the invention applied;

Figure 2 is a section on the line 2—2 of Figure 1;

Figure 3 is a similar view on the line 3—3 of Figure 1;

Figure 4 is a detail side elevation of the sprocket gear;

Figure 5 is a detail perspective of the clutch;

Figure 6 is an elevation of the cooperating clutch pin; and

Figure 7 is a detail perspective of a portion of the power shaft.

Like numerals refer to like parts throughout the several figures of the drawing.

The invention is herein shown as applied to a piano player action of substantially the type shown in my prior Patent No. 1,373,100 dated March 29, 1921, in which the take-up shaft is driven during the playing operation and the shaft for the music roll driven at a different speed during the rewinding operation and after the disconnection of the take-up shaft from its driving mechanism. The invention, however, is not confined to its application to such a specific construction but is capable of adaptation to other forms of player action in which driving shafts for the rolls are alternately driven for winding and rewinding purposes.

In the form shown the numeral 10 designates the frame of the mechanism to which a bearing plate 11 is secured and this plate supports a parallel bearing plate 12 by means of intermediate posts 13. The plate 11 is provided with suitable bearings 14 which are insertable in apertures through the frame and the plate 12 with a corresponding bearing 15, these being substantially duplicated at the upper and lower portions of the frame. The upper bearings carry the shaft 16 having the connector 17 adapted to engage a music roll in the usual manner, and the opposite end of this shaft engages an adjustable set screw 18 and cooperates with a pneumatic device 19, as more fully described in connection with my before mentioned patent. The lower bearings carry the driving shaft 20 for the take-up roll which is provided at one end with a connection 21 for engagement with such roll and at its opposite end with an adjustable set screw 22 to maintain the shaft in proper position. This set screw is mounted in the lower bearing 15 by means of a threaded aperture 23 therein and secured by a lock nut 24.

The plates 11 and 12 also carry bearings 25 and 26 which are mounted therein and carry the power shaft 27 which is driven in any suitable manner, for instance by means of a suitable sprocket 28 and chain 29. Longitudinal movement of this shaft within its bearings is prevented by means of a set collar 30 disposed thereon and engaging the bearing 26, while the opposite end of the shaft is provided with a cotter pin 31 within the bearing 25. The transmission means carried by the power shaft 27 may be of any desired character, for instance that for the music roll shaft may comprise a sprocket gear 32 provided with a circumferential groove 33 on its hub which is engaged by a finger 34 mounted upon the plate 12 so as to prevent longitudinal movement thereof yet permit the free rotation of the gear upon the shaft. The shaft is also provided with a freely rotatable pinion 35 formed with a disk 36 and normally held against longitudinal displacement upon the shaft 27 by means of a shoulder 37 thereon, as indicated in Figure 7.

Intermediate of the sprocket gear and pinion a clutch device is slidingly splined upon the shaft and may comprise a double or opposite faced clutch 38 as shown in Figure 5, which is provided with an interior key way 39 slidingly mounted upon the gib or key 40 carried by the shaft 27. This clutch is also formed with a circumferential channel or dwell 41 adapted to receive a connecting pin 42 from the shift lever 43 by which the clutch may be alternately engaged with either of the transmission devices. In order to effect this engagement without noise or undue friction, each of the transmission devices is provided with a yielding clutch member such as the pin 44 slidingly mounted in the disk 36 and normally projected longitudinally by means of a spring 45 secured to the disk 36 as shown in Figure 3. The sprocket gear 32 is also provided with a similar clutch pin 46 projected outwardly under tension of the spring 47 as shown in Figure 4.

In the shifting of the clutch lever if the tooth face of the clutch engage this pin upon one of the inclined faces the pin will recede or yield and ride thereon until it reaches the straight or holding face of the clutch when it will automatically drop into retaining position and thus effect a positive driving action so long as the clutch is in contact therewith.

The clutch lever 43 may be of any desired construction, a desirable form being that shown where the lever is pivoted at 48 in a bracket 49 carried by the plate 11 and the upper end 50 of the lever retained in its opposite shifted positions by means of a friction block 51 formed with an inclined or grooved face 52 adapted to ride upon the end of the lever. This block is pivotally mounted at 53 and normally projected toward the lever by means of a tension spring 54 of angular construction bearing against the block at 55 and against one of the posts 13. The opposite end of the spring may be adjusted to vary the tension thereof by means of a post and nut 56 carried by the friction block 51. This block also carries a brake shoe 57 which cooperates with the periphery of a brake wheel 58 secured upon the shaft 16. The effect of this construction is to permit the block 51 to engage the brake wheel and resist the free rotation of the shaft 16 for the music roll when the driving power is applied to the take-up roll in the ordinary playing action. The lever 43 may be shifted in any desired manner, for instance by a connection 59 extending to the usual rewind lever of the apparatus. When the parts are shifted for reverse or rewind drive the power is applied to the music roll shaft and at that time the end of the brake lever engages and lifts the brake shoe from contact with the wheel upon the shaft to permit its free driving action.

For the purpose of driving the shaft 20 for the take-up roll a gear 60 is secured thereon and remains in constant mesh with the pinion 35 of the driving pinion. When the driving action is shifted to the music roll shaft as indicated by full lines in Figure 1, it is desirable to resist the free rotation of the take-up shaft due to the sheet being drawn therefrom under power, and for this purpose a brake device engaging the gear 60 is provided. A suitable form of such device may comprise the angle plate 61 provided with a brake shoe 62 at one end and adapted at its opposite end 63 to be engaged by a pin 64 upon the shift lever 43, as indicated in Figure 1. This plate has a pivotal movement upon its support at 65 and is normally held in released position by means of a tension spring 66 bearing thereon. A construction is thus provided by which when either shaft is driven the rotation of the other shaft will be frictionally resisted by a braking device automatically applied in the movement of the shift lever for establishing the transmitting connections.

In the operation of the invention it will be seen that the parts when in the position shown by full lines in Figure 1 are connected for positively driving the music roll for a rewinding action and the clutch lever at that time applies the brake to the driving shaft of the take-up roll and releases it from the shaft of the music roll so as to effect an even and tight rewinding of the music sheet upon its roll and prevent the formation of slack owing to the overrunning of the free take-up roll. When the lever is shifted to its opposite or dotted line position in Figure 1 the clutch is engaged to drive the take-up roll to secure the usual feed of the music sheet during the playing action and at that time the brake for the shaft of the take-up roll is released and that for the music roll applied so that these brakes operate in alternation. The construction of the mechanisms shown provides for the constant meshing relation between the driving pinion and gear for the take-up roll and for a yielding clutch engagement between the parts which practically eliminates noise, wear and slack movement during such operation.

While the specific construction of this mechanism has been shown and described, still the invention is not confined thereto as changes and alterations may be made without departing from the spirit of the invention as recited in the following claims.

Having thus described my invention, what I claim as new and desire to secure by Letters Patent is:

1. In a mechanism of the class described, a power shaft, driving shafts for independent rolls, transmission means on said power shaft operatively connected to said driving shafts, an overrunning clutch device shiftable upon the power shaft to engage either transmission means, and a member upon said means to yieldingly engage the face of said clutch to permit feeding of a roll independent of the power shaft when in driving relation.

2. In a mechanism of the class described, a power shaft, driving shafts for independent rolls, transmitting gears loosely mounted upon said shaft and operatively connected to said driving shafts, a slidingly keyed clutch provided with opposite ratchet faces adapted to alternately engage said transmission gears, and means upon said gears adapted to yieldingly engage said clutch to permit independent feeding movement of either gear when in driving relation.

3. In a mechanism of the class described, a power shaft, a driving shaft for a take-up roll provided with a gear secured thereon, a cooperating pinion loosely mounted upon said power shaft, a clutch device slidingly splined upon the power shaft and provided with ratchet teeth having inclined and abutting faces, and a yielding pin upon said pinion normally projected outward into the path of the ratchet teeth to ride upon the inclined face into contact with the abutting face and permit feeding of the pinion independent of the power shaft when in driving relation.

4. In a mechanism of the class described, a power shaft, a driving shaft for a take-up roll, a gear secured thereon, a transmission device upon the power shaft cooperating with said gear, a lever for shifting said transmission device into and out of driving relation, a brake member having a shoe adapted to engage a gear upon the take-up shaft, an angle arm from said member, a projection upon the shift lever disposed to travel upon said arm when the lever is in one driving relation to cause braking action, and tension means arranged to release said brake when the lever projection is out of contact with said arm.

5. In a mechanism of the class described, a power shaft, driving shafts for independent rolls, transmission means on said power shaft adapted to be operatively connected to rotate either of the driving shafts in one direction, and means comprising a member of the transmission to permit a rotation in the driving direction independent of the driving mechanism of one of the shafts when coupled thereto.

In testimony whereof I affix my signature.

JOHN T. RYDBERG.